(12) United States Patent
Hashimoto et al.

(10) Patent No.: US 8,309,261 B2
(45) Date of Patent: Nov. 13, 2012

(54) FUEL CELL WITH CONTROL UNIT FOR RECIRCULATING FUEL

(75) Inventors: Takuya Hashimoto, Toyota (JP); Hideki Kubo, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 340 days.

(21) Appl. No.: 12/666,489

(22) PCT Filed: Jun. 30, 2008

(86) PCT No.: PCT/JP2008/062242
§ 371 (c)(1),
(2), (4) Date: Dec. 23, 2009

(87) PCT Pub. No.: WO2009/005158
PCT Pub. Date: Jan. 8, 2009

(65) Prior Publication Data
US 2011/0008699 A1      Jan. 13, 2011

(30) Foreign Application Priority Data
Jul. 4, 2007   (JP) .................. 2007-176306

(51) Int. Cl.
*H01M 8/04*   (2006.01)
(52) U.S. Cl. ......... 429/414; 429/415; 429/444; 429/450
(58) Field of Classification Search .................. 429/408, 429/413, 415, 450
See application file for complete search history.

(56) References Cited

U.S. PATENT DOCUMENTS

| | | | |
|---|---|---|---|
| 6,524,733 B1 * | 2/2003 | Nonobe | 429/413 |
| 2004/0137298 A1 * | 7/2004 | Sugiura et al. | 429/32 |

FOREIGN PATENT DOCUMENTS

| | | |
|---|---|---|
| DE | 101 51 093 A1 | 4/2003 |
| DE | 10 2005 055 741 A1 | 5/2007 |
| JP | 2000-340241 A | 12/2000 |
| JP | 2002-083613 A | 3/2002 |
| JP | 2004-127914 A | 4/2004 |
| JP | 2007-052988 A | 3/2007 |
| JP | 2007-220322 A | 8/2007 |
| JP | 2008-041625 A | 2/2008 |
| WO | 00/17952 A1 | 3/2000 |

OTHER PUBLICATIONS

Office Action issued Dec. 9, 2011 in German Patent Application No. 11 2008 001 769.7-45 and English translation thereof.

* cited by examiner

*Primary Examiner* — Keith Walker
(74) *Attorney, Agent, or Firm* — Kenyon & Kenyon LLP

(57) ABSTRACT

This invention provides a fuel cell system which can render the distribution of water in an electrolyte membrane even without lowing the pressure of a fuel system (1) comprises an electrolyte membrane (11), an oxidant electrode provided on one side of the electrolyte membrane (11), and a fuel electrode provided on the other side of the electrolyte membrane (11). An oxidant gas flow passage (14) for supplying an oxidant gas along the face of the oxidant electrode and a fuel gas flow passage (15) for supplying a fuel has along the face of the fuel electrode are provided so that the flow direction of the oxidant gas faces the flow direction of the fuel gas. A control unit (50) conducts control so that, when the electrolyte membrane (11) is dry, the flow rate of the fuel gas which flows through the fuel gas flow passage (15) is increased.

2 Claims, 4 Drawing Sheets

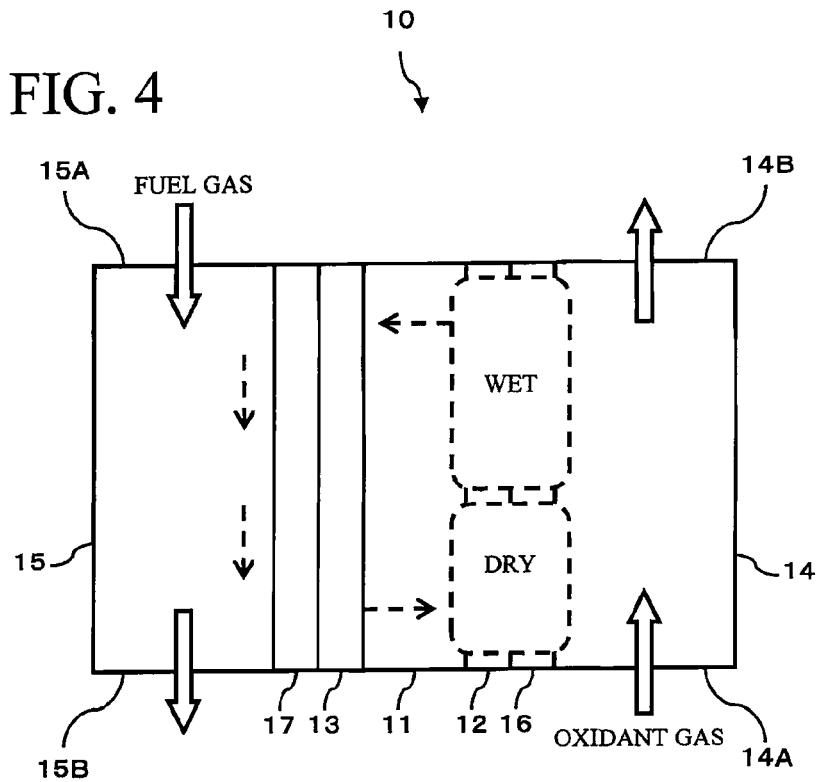
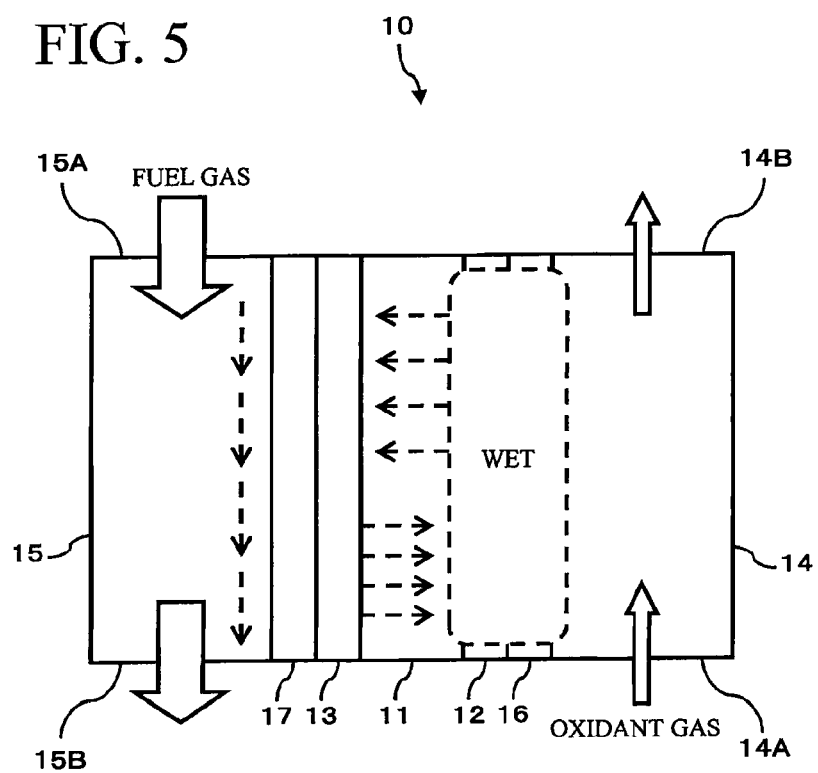

FUEL CELL WITH CONTROL UNIT FOR RECIRCULATING FUEL

This is a 371 national phase application of PCT/JP2008/062242 filed 30 Jun. 2008, claiming priority to Japanese Patent Application No. JP 2007-176306 filed 4 Jul. 2007, the contents of which are incorporated herein by reference.

TECHNICAL FIELD

The present invention relates to a fuel cell system and to a control unit for the fuel cell system.

BACKGROUND ART

There is known a fuel cell system having an electrolyte membrane, an oxidant electrode provided on one side of the electrolyte membrane, and a fuel electrode provided on the other side, and for generating power by means of an oxidant gas such as air including oxygen supplied to the oxidant electrode, and a fuel gas including hydrogen supplied to the fuel electrode (refer to, for example, Japanese Patent Application Laid-Open Nos. 2004-127914 and 2000-340241).

In such a fuel cell system, when water content in the electrolyte membrane becomes insufficient, impedance of the electrolyte membrane becomes high, and an output of the cell is lowered.

Japanese Patent Application Laid-Open No. 2004-127914 proposes, as a technique for preventing lowering of output of a cell due to insufficient water content of the electrolyte membrane, setting the pressure of hydrogen lower than that of air in the case where water content in a fuel cell is insufficient, to thereby promote shift of water from an oxidant electrode side to a fuel electrode side via the electrolyte membrane.

Japanese Patent Application Laid-Open No. 2000-340241 discloses a technique of supplying oxygen-containing gas to an oxidant electrode with pressure higher than that of hydrogen-containing gas which is supplied to a fuel electrode, thereby exhausting water generated on the oxidant electrode side to the fuel electrode side with the pressure difference, and compensating water required on the fuel electrode side.

DISCLOSURE OF THE INVENTION

However, in the technique disclosed in Japanese Patent Application Laid-Open No. 2004-127914, by lowering the pressure of hydrogen, a state where hydrogen required for power generation may become insufficient; that is, a hydrogen-deficient state, may be produced.

The present invention therefore provides a fuel cell system capable of uniformizing a water content distribution in an electrolyte membrane without lowering the pressure of fuel gas.

A fuel cell system according to the present invention has an electrolyte membrane, an oxidant electrode provided on one side of the electrolyte membrane, and a fuel electrode provided on the other side of the electrolyte membrane. In the fuel cell system, an oxidant gas flow passage for supplying oxidant gas along a face of the oxidant electrode and a fuel gas flow passage for supplying fuel gas along a face of the fuel electrode are provided so that a flow direction of the oxidant gas and that of the fuel gas are opposite each other. The fuel cell system has control unit that performs control of increasing flow rate of the fuel gas flowing in the fuel gas flow passage in the case where the electrolyte membrane is dry.

In an aspect of the present invention, in the case where the electrolyte membrane is dry and an operating state of the fuel cell system is a predetermined high-load state, the control unit performs a control of lowering pressure of the fuel gas in the fuel gas flow passage.

A control unit according to the present invention is for a fuel cell system having an electrolyte membrane, an oxidant electrode provided on one side of the electrolyte membrane, and a fuel electrode provided on the other side of the electrolyte membrane, in which an oxidant gas flow passage for supplying oxidant gas along a face of the oxidant electrode and a fuel gas flow passage for supplying fuel gas along a face of the fuel electrode are provided so that a flow direction of the oxidant gas and that of the fuel gas are opposite each other. The control unit performs control of increasing flow rate of the fuel gas flowing in the fuel gas flow passage in the case where the electrolyte membrane is dry.

In an aspect of the present invention, in the case where the electrolyte membrane is dry and an operating state of the fuel cell system is a predetermined high-load state, the control unit performs control of lowering pressure of the fuel gas in the fuel gas flow passage.

The present invention can provide a fuel cell system capable of making uniform water content distribution of an electrolyte membrane without lowering pressure of fuel gas.

BRIEF DESCRIPTION OF DRAWINGS

FIG. 4 is a schematic diagram showing the case where an electrolyte membrane is dry; and FIG. 5 is a schematic diagram showing the case where flow rate of hydrogen is increased.

BEST MODE FOR CARRYING OUT THE INVENTION

An embodiment of the present invention will be described below with reference to the drawings.

Figure 1:
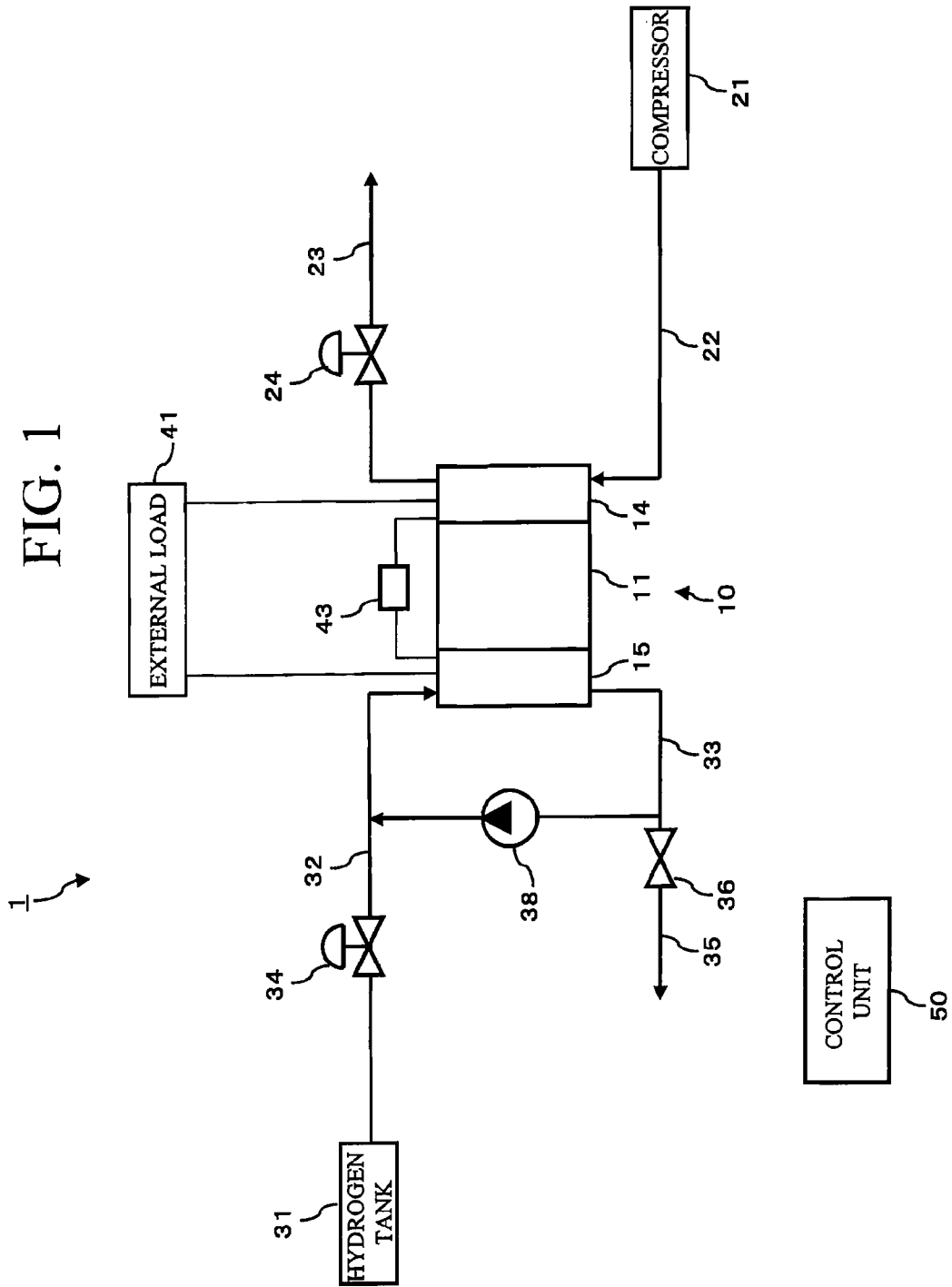
FIG. 1 is a schematic diagram showing the configuration of a fuel cell system of an embodiment of the invention.

FIG. 1 is a schematic diagram showing the configuration of a fuel cell system 1 of an embodiment of the present invention. The fuel cell system 1 is a system for generating power by means of oxidant gas and fuel gas. In the embodiment, the fuel cell system 1 is mounted on a fuel-cell vehicle. However, application of the fuel cell system 1 is not limited to a fuel cell vehicle.

In FIG. 1, the fuel cell system 1 has a fuel cell 10. The fuel cell 10 receives supply of oxidant gas and fuel gas and generates power. Concretely, the oxidant gas is a gas including oxygen such as air, and the fuel gas is a gas including hydrogen. The fuel cell 10 generates power by means of electrochemical reaction between hydrogen and oxygen. The fuel cell 10 is, for example, a solid polyelectrolyte fuel cell.

Figure 2:
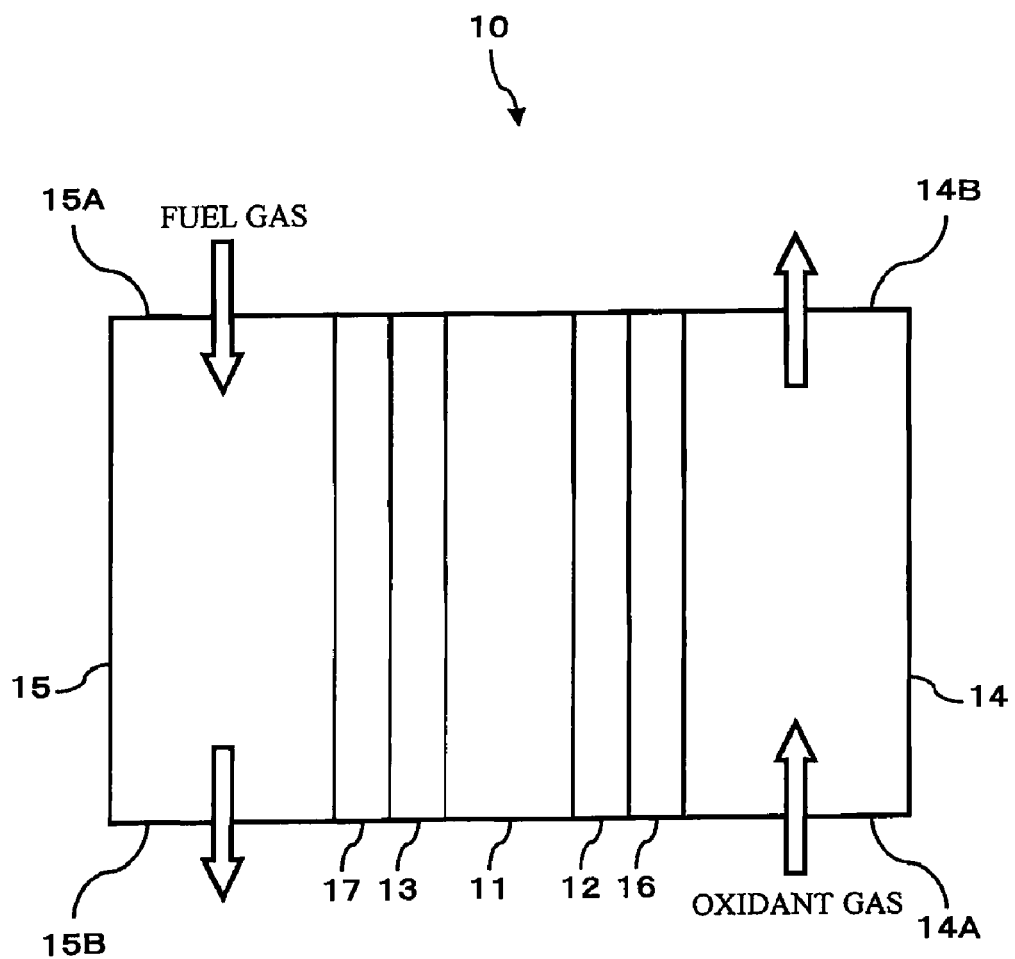
FIG. 2 is a schematic cross section showing the configuration of a fuel cell.

FIG. 2 is a schematic cross section showing the configuration of the fuel cell 10. Referring to FIG. 2, the configuration of the fuel cell 10 will be described. In the embodiment, the fuel cell 10 has a stack structure in which a number of unit cells are stacked. For the sake of convenience, FIG. 2 shows a single cell.

In FIG. 2, the fuel cell 10 includes an electrolyte membrane 11, an oxidant electrode (called cathode) 12 provided on one side of the electrolyte membrane 11, and a fuel electrode (called anode) 13 provided on the other side of the electrolyte membrane 11. Concretely, the fuel cell 10 includes a membrane electrode assembly (MEA) obtained by joining the oxidant electrode 12 and the fuel electrode 13 to the electrolyte membrane 11.

On the outer face side of the oxidant electrode 12, there is provided an oxidant gas flow passage 14 for supplying oxidant gas to the oxidant electrode 12 along the face of the oxidant electrode 12. On the outer face of the fuel electrode 13, there is provided a fuel gas flow passage 15 for supplying the fuel gas to the fuel electrode 13 along the face of the fuel electrode 13. Concretely, on the outer face side of the oxidant electrode 12, a separator in which the oxidant gas flow passage 14 is formed is provided via a diffusion layer 16. On the outer face side of the fuel electrode 13, a separator in which the fuel gas flow passage 15 is formed is provided via a diffusion layer 17.

In the embodiment, the oxidant gas flow passage 14 and the fuel gas flow passage 15 are provided so that the flow direction of the oxidant gas in the oxidant gas flow passage 14 and that of the fuel gas in the fuel gas flow passage 15 are opposite each other. In this case, the flow direction of the oxidant gas and that of the fuel gas may be opposite each other in at least a partial area in the face of the fuel cell 10 or opposite each other obliquely.

The power generating action of the fuel cell 10 will be described. The oxidant gas is supplied to the oxidant gas flow passage 14 via an inlet port 14A of the passage, so that the oxidant gas is supplied to the oxidant electrode 12. Meanwhile, the fuel gas is supplied to the fuel gas flow passage 15 via an inlet port 15A of the passage, so that the fuel gas is supplied to the fuel electrode 13. The fuel cell 10 generates power by means of the oxidant gas supplied to the oxidant electrode 12 and the fuel gas supplied to the fuel electrode 13. Concretely, by means of platinum catalysis or the like, a reaction expressed by the following equation (1) occurs on the fuel electrode 13 side, a reaction expressed by the following equation (2) occurs on the oxide electrode 12 side, and an electrogenic reaction expressed by the following equation (3) occurs as a whole.

$$H_2 \rightarrow 2H^+ + 2e^- \quad (1)$$

$$2H^+ + (1/2)O_2 + 2e^- \rightarrow H_2O \quad (2)$$

$$H_2 + (1/2)O_2 \rightarrow H_2O \quad (3)$$

A cathode offgas is exhausted from the oxidant gas flow passage 14 via an outlet port 14B, and an anode offgas is exhausted from the fuel gas flow passage 15 via an outlet port 15B.

Referring again to FIG. 1, an oxidant supply flow passage 22 for guiding air supplied from a compressor 21 to the oxidant gas flow passage 14 is connected to the inlet port of the oxidant gas flow passage 14. Meanwhile, an oxidant exhaust flow passage 23 for guiding the cathode offgas exhausted from the oxidant gas flow passage 14 to the outside is connected to the outlet port of the oxidant gas flow passage 14. The oxidant exhaust flow passage 23 is provided with a pressure adjustment valve 24 for adjusting the pressure of the gas in the flow passage. Although not shown in FIG. 1, each of the flow passages 22 and 23 connected to the oxidant gas flow passage 14 is provided with a pressure sensor for measuring pressure of the gas in the flow passage, a valve for opening/closing the flow passage (air shut valve), a humidification module, and the like.

Meanwhile, a fuel supply flow passage 32 for guiding hydrogen supplied from a hydrogen tank 31 for storing high-pressure hydrogen gas to the fuel gas flow passage 15 is connected to the inlet port of the fuel gas flow passage 15. A circulation flow passage 33 for returning the anode offgas exhausted from the fuel gas flow passage 15 to the fuel supply flow passage 32 is connected to the outlet port of the fuel gas flow passage 15. The fuel supply flow passage 32 is provided with a pressure adjustment valve 34 for adjusting pressure of the gas in the flow passage. The circulation flow passage 33 is provided with a hydrogen pump 38 for making hydrogen circulate. A fuel exhaust flow passage 35 for guiding the anode offgas exhausted from the fuel gas flow passage 15 to the outside is connected to the circulation flow passage 33. The fuel exhaust flow passage 35 is provided with a purge valve 36 for opening/closing the flow passage. Although not shown in FIG. 1, each of the flow passages 32 and 33 connected to the fuel gas flow passage 15 is provided with a pressure sensor for measuring pressure of the gas in the flow passage, a valve for opening/closing the flow passage (air shut valve), and the like.

An external load 41 is electrically connected to the fuel cell 10. The external load 41 is, for example, a DC/DC converter, a load (such as a secondary cell, a capacitor, an accessory, a resistor, or the like) connected to the fuel cell 10 via the DC/DC converter, or the like.

Further, the fuel cell system 1 has an impedance-measuring unit 43 for measuring impedance of the fuel cell 10, and a control unit 50 for controlling the entire fuel cell system 1. Concretely, the control unit 50 controls devices to be controlled (the compressor 21, the pressure adjustment valve 24, the hydrogen pump 38, the pressure adjustment valve 34, and the like) based on various types of input information (such as an output value of the impedance-measuring unit 43).

The control unit 50 can be realized by an appropriate configuration. In the embodiment, the control unit 50 includes a CPU (Central Processing Unit), a ROM (Read Only Memory), a main memory, and the like. The function of the control unit 50 is realized when a control program stored in a storing medium such as ROM is executed by the CPU.

In the configuration, when the electrolyte membrane 11 becomes dry, the impedance of the electrolyte membrane 11 increases, and an output of the fuel cell 10 lowers.

Consequently, from the viewpoint of preventing drop in the output of the fuel cell 10 due to dryness of the electrolyte membrane 11, the control unit 50 performs control as described below. Specifically, in the case where the electrolyte membrane 11 is dry, the control unit 50 performs control of increasing the flow rate of the fuel gas flowing in the fuel gas flow passage 15. Concretely, the control unit 50 determines whether or not the electrolyte membrane 11 is dry. When a determination is made that the electrolyte membrane 11 is dry, the control unit 50 performs the control of increasing the flow rate of the fuel gas flowing in the fuel gas flow passage 15.

"Increase in the flow rate of the fuel gas" denotes increase in the flow rate of the fuel gas to a value higher than that of the fuel gas in normal time. Concretely, it means increase in the flow rate of the fuel gas using, as a reference, the flow rate of the fuel gas which is preliminarily set according to a target output; for example, the flow rate of the fuel gas corresponding to a target output in a prepared control map.

In the embodiment, the control unit 50 determines whether or not the electrolyte membrane 11 is dry based on the impedance measured by the impedance-measuring unit 43. The determination of whether or not the electrolyte membrane 11 is dry may be performed by another method.

In the embodiment, the control unit 50 performs control of increasing the rotational speed of the hydrogen pump 38 as control of increasing the flow rate of the fuel gas. Increase in the flow rate of the fuel gas may be realized by another method.

In the embodiment, when the electrolyte membrane 11 is dry and the operating state of the fuel cell system 1 is a predetermined high-load state, the control unit 50 performs control of decreasing the pressure of the fuel gas in the fuel gas flow passage 15, thereby promoting shift of water content from the oxidant electrode 12 side to the fuel electrode 13 side.

In an aspect, from the viewpoint that the fuel rate of the fuel gas increases as the load becomes higher and an upper limit is imposed on the flow rate of the fuel gas, in the case where a high-load state is produced in which the flow rate of the fuel gas cannot be increased, the control unit 50 performs control of lowering the pressure of the fuel gas.

Concretely, in the case where the rotational speed of the hydrogen pump 38 reaches a predetermined rotational speed, from the viewpoint that the upper limit is imposed on the rotational speed of the hydrogen pump 38, the control unit 50 performs control of lowering the hydrogen pressure.

In another aspect, from the viewpoint that the pressure of the fuel gas increases and then the risk of an insufficiency of fuel gas caused by lowering the pressure of the fuel gas is decreased as the load becomes higher, in the case where a high-load state is produced in which the pressure of the fuel gas can be lowered, the control unit 50 performs control of lowering the pressure of the fuel gas.

Concretely, from the viewpoint that the possibility of hydrogen becoming insufficient is low when hydrogen pressure is high, in the case where the hydrogen pressure is a predetermined value or higher, the control unit 50 performs control of lowering the hydrogen pressure.

In still another aspect, in the case where a required output is a predetermined value or higher, the control unit 50 performs control of lowering the pressure of the fuel gas.

In the following, the operation of the fuel cell system 1 having the configuration will be described concretely.

In accordance with a required output, the control unit 50 determines target values of output voltage and output current by reference to a preset current-voltage characteristic map (I-V characteristic map) of the fuel cell 10. In accordance with the target values of the output voltage and the output current, and by reference to the preset control map, the control unit 50 determines target values of the pressure and flow rate of air supplied to the oxidant electrode 12 and the pressure and flow rate of hydrogen supplied to the fuel electrode 13. The control unit 50 controls the pressure adjustment valve 24, the compressor 21, the pressure adjustment valve 34, and the hydrogen pump 38 so that the pressure and flow rate of air supplied to the oxidant electrode 12 and the pressure and flow rate of hydrogen supplied to the fuel electrode 13 attain their target values. At the time of controlling the pressures and flow rates to target values, a pressure sensor and a flow rate sensor may be used.

By means of the control of the control unit 50, hydrogen is supplied from the hydrogen tank 31 to the fuel gas flow passage 15 via the fuel supply flow passage 32, air is supplied from the compressor 21 to the oxidant gas flow passage 14 via the oxidant supply flow passage 22, and the fuel cell 10 generates power.

From the fuel gas flow passage 15, anode offgas including hydrogen which did not contribute to the reaction is exhausted. The anode offgas passes through the circulation flow passage 33 and is supplied again to the fuel gas flow passage 15. Since at this time the anode offgas includes impurities other than hydrogen, the hydrogen concentration in the anode offgas lowers during the course of circulation. Consequently, the purge valve 36 is opened at a proper timing, and the anode offgas whose hydrogen concentration lowers is exhausted to the outside via the fuel exhaust flow passage 35.

Meanwhile, cathode offgas is exhausted from the oxidant gas flow passage 14, and is exhausted to the outside via the oxidant exhaust flow passage 23.

Figure 3:
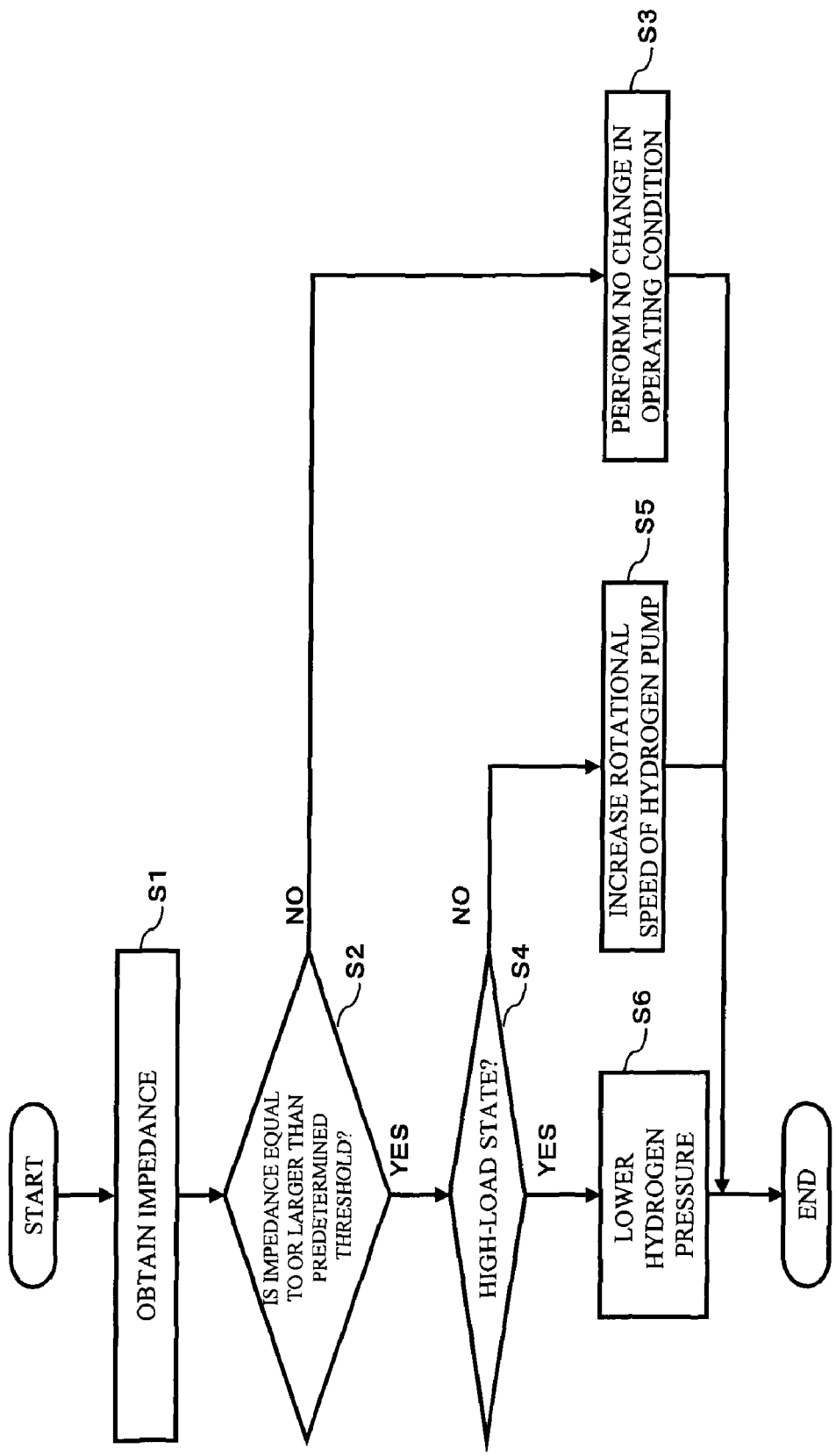
FIG. 3 is a flowchart showing processes executed by a control unit.

In the embodiment, to prevent decrease in battery output due to dryness of the electrolyte membrane 11, the control unit 50 performs processing shown in FIG. 3. The processing shown in FIG. 3 is performed repeatedly, as appropriate.

In FIG. 3, the control unit 50 obtains the impedance of the fuel cell 10 measured by the impedance-measuring unit 43 (S1).

Subsequently, the control unit 50 determines whether or not the obtained impedance is equal to or higher than a predetermined threshold (S2).

In the case where a determination is made that the impedance is not equal to or higher than the predetermined threshold (NO in S2), the control unit 50 does not change operation conditions such as pressure and flow rate (S3).

On the other hand, in the case where a determination is made that the impedance is equal to or higher than the predetermined threshold (YES in S2), the control unit 50 determines whether or not the operating state of the fuel cell system 1 is in a predetermined high-load state (S4). For example, the control unit 50 determines whether or not the rotational speed of the hydrogen pump 38 has reached the upper limit.

In the case where a determination is made that the operating state is not the predetermined high-load state (NO in S4); that is, in the case of low-load operation (for example, normal-range operation), the control unit 50 increases the rotational speed of the hydrogen pump 38 only by a predetermined rotational speed (S5). As a result, the flow rate of hydrogen in the fuel gas flow passage 15 increases, shift of water content in the fuel cell 10 is promoted (that is, internal humidification effect is increased), the water content distribution in the fuel cell 10 is made uniform, and the impedance of the fuel cell 10 lowers.

On the other hand, in the case where a determination is made that the operating state is the predetermined high-load state (YES in S4); that is, in the case of high-load operation (for example, when maximum output is required), the control unit 50 controls the pressure adjustment valve 34 to lower the hydrogen pressure (S6). As a result, the pressure (anode pressure) of hydrogen on the fuel electrode 13 side becomes lower than the pressure (cathode pressure) of air on the oxidant electrode 12 side. Due to the pressure difference, transmission of water from the oxidant electrode 12 side to the fuel electrode 13 side is promoted, and the impedance of the fuel cell 10 lowers.

FIG. 4 is a schematic diagram showing the case where the electrolyte membrane 11 is dry. FIG. 5 is a schematic diagram showing the case where the flow rate of hydrogen is increased. In the following, by reference to FIGS. 4 and 5, uniformization of the water content distribution of the electrolyte membrane 11 by increase in the flow rate of hydrogen will be described. In FIGS. 4 and 5, arrows of broken lines indicate shifts of water.

As shown in FIG. 4, when dry, the upstream side of the flow of air in the electrolyte membrane 11 is dry, and the downstream side is wet for the reason that water generated by the oxidant electrode 12 is moved by the flow of air.

In the electrolyte membrane 11, water on the oxidant electrode 12 side passes to the fuel electrode 13 side. In the embodiment, the flow direction of air and that of hydrogen are opposite each other. The downstream side of air corresponds to the upstream side of hydrogen, and the upstream side of air corresponds to the downstream side of hydrogen. Consequently, on the fuel electrode 13 side, the upstream side of hydrogen is wet, and the downstream side of hydrogen is dry.

In the state shown in FIG. 4, the power generation performance decreases due to the dry state of the electrolyte membrane 11 on the upstream side of air; power generation is concentrated on the downstream side, and an output of the fuel cell 10 decreases as a whole. Such a dry state is caused by, for example, low-load operation, high-temperature operation, or the like.

In such a case, as shown in FIG. 5, when the hydrogen flow rate is increased, the shift amount of water from the upstream side of hydrogen to the downstream side increases on the fuel electrode 13 side on the face of the fuel cell 10. In the dry state of FIG. 4, the upstream side of hydrogen is wet and the downstream side is dry. Consequently, due to increase in the hydrogen flow rate, uniformization of the water content distribution in the face on the fuel electrode 13 side is promoted. In association with the above, the amount of shift in water content from the oxidant electrode 12 side on the downstream side of air (the upstream side of hydrogen) to the fuel electrode 13 side also increases, and the shift amount of water content from the fuel electrode 13 side on the upstream side of air (the downstream side of hydrogen) to the oxidant electrode 12 side also increases. As a result, the water content distribution of the electrolyte membrane 11 is made uniform, the power generation distribution is also made uniform, the impedance of the fuel cell 10 lowers, and an output of the fuel cell 10 improves.

As described above, in the embodiment, the fuel cell system has an electrolyte membrane, an oxidant electrode provided on one side of the electrolyte membrane, and a fuel electrode provided on the other side of the electrolyte membrane. In the fuel cell system, an oxidant gas flow passage for supplying oxidant gas along a face of the oxidant electrode and a fuel gas flow passage for supplying fuel gas along a face of the fuel electrode are provided so that a flow direction of the oxidant gas and that of the fuel gas are opposite each other. In the case where the electrolyte membrane is dry, control of increasing flow rate of the fuel gas flowing in the fuel gas flow passage is performed. Consequently, in the embodiment, by increasing the flow rate of the fuel gas, shift of water content can be promoted. Without lowering the pressure of the fuel gas, the water content distribution in the electrolyte membrane can be made uniform. As a result, while avoiding or reducing occurrence of an insufficient state of fuel gas caused by a drop in the pressure of the fuel gas (concretely, hydrogen insufficient state due to a drop in the hydrogen pressure), drop in the output of the cell due to dryness of the electrolyte membrane can be avoided or reduced.

In the embodiment, in the case where the electrolyte membrane is dry and the operating state of the fuel cell system is a predetermined high-load state, control of lowering pressure of the fuel gas in the fuel gas flow passage is performed. Consequently, in the case where the flow rate of the fuel gas cannot be increased in the high-load state, by lowering the pressure of the fuel gas, the water content distribution in the electrolyte membrane can be made uniform. In the case where there is no possibility that a fuel gas insufficient state (concretely, hydrogen insufficient state) occurs even when the pressure of the fuel gas is lowered in the high-load state, by lowering the pressure of the fuel gas, the water content distribution of the electrolyte membrane can efficiently be made uniform.

The present invention is not limited to the foregoing embodiment but can be modified in various manners without departing from the gist of the present invention.

For example, in place of the pressure adjustment valve 34, an injector may be provided to adjust the pressure of the fuel gas by controlling the on/off state of the injector.

In the foregoing embodiment, shift of water is promoted by lowering the pressure of the fuel gas in the high-load state. Shift of water may be also promoted by increasing the pressure of the oxidant gas. However, from the viewpoint of energy efficiency (concretely, accessory loss), lowering the pressure of the fuel gas is preferred.

The invention claimed is:

1. A fuel cell system including an electrolyte membrane, an oxidant electrode provided on one side of the electrolyte membrane, and a fuel electrode provided on the other side of the electrolyte membrane, in which an oxidant gas flow passage for supplying oxidant gas along a face of the oxidant electrode and a fuel gas flow passage for supplying fuel gas along a face of the fuel electrode are provided so that a flow direction of the oxidant gas and that of the fuel gas are opposite each other, the system comprising:
    a hydrogen pump that recirculates the fuel gas; and
    control unit that is programmed to cause the hydrogen pump to operate faster to thereby cause an increase in the recirculation of fuel gas in the fuel gas flow passage in the case where the electrolyte membrane is dry; and
    the control unit is further programmed to also cause lowering pressure of the fuel gas in the fuel gas flow passage when the electrolyte membrane is dry and the fuel cell system is at or above a speed limit of the hydrogen pump or a limit on the flow rate of fuel gas.

2. A control unit for a fuel cell system including an electrolyte membrane, an oxidant electrode provided on one side of the electrolyte membrane, a fuel electrode provided on the other side of the electrolyte membrane, in which an oxidant gas flow passage for supplying oxidant gas along a face of the oxidant electrode and a fuel gas flow passage for supplying fuel gas along a face of the fuel electrode are provided so that a flow direction of the oxidant gas and that of the fuel gas are opposite each other, and a hydrogen pump that recirculates the fuel gas;
    wherein the control unit is programmed to cause the hydrogen pump to operate faster to thereby cause an increase in the recirculation of fuel gas in the fuel gas flow passage in the case where the electrolyte membrane is dry; and
    the control unit is further programmed to also cause lowering pressure of the fuel gas in the fuel gas flow passage when the electrolyte membrane is dry and the fuel cell system is at or above a speed limit of the hydrogen pump or a limit on the flow rate of fuel gas.

* * * * *